United States Patent
Chen et al.

(10) Patent No.: US 7,623,889 B2
(45) Date of Patent: Nov. 24, 2009

(54) MOBILE COMMUNICATION APPARATUS WITH MULTIMEDIA AUDIO/VIDEO FUNCTIONS

(75) Inventors: Jammy Chen, Taipei (TW); Jia-Ming Yeh, Taipei (TW)

(73) Assignee: Inventec Corporation, Taipei (TW)

( * ) Notice: Subject to any disclaimer, the term of this patent is extended or adjusted under 35 U.S.C. 154(b) by 499 days.

(21) Appl. No.: 11/709,217

(22) Filed: Feb. 22, 2007

(65) Prior Publication Data
US 2008/0207255 A1 Aug. 28, 2008

(51) Int. Cl.
*H04M 1/00* (2006.01)
(52) U.S. Cl. .............. 455/550.1; 455/575.1; 455/556.1; 455/557; D14/507
(58) Field of Classification Search .............. 455/550.1, 455/575.1, 556.1, 557; D14/507
See application file for complete search history.

(56) References Cited

U.S. PATENT DOCUMENTS

2006/0234784 A1* 10/2006 Reinhorn .................. 455/575.1

* cited by examiner

*Primary Examiner*—Nghi H Ly
(74) *Attorney, Agent, or Firm*—Bacon & Thomas, PLLC

(57) ABSTRACT

A mobile communication apparatus with multimedia audio/video functions includes an upper casing, a lower casing movably connected to a backside of the upper casing, and an audio/video capturing module mounted on one end of the upper casing. The upper and lower casings are engaged with each other, and the audio/video capturing module is used to receive and sample an image and/or a sound source within an area, and then output an audio/video signal which is sent to a screen display mounted on a surface of the upper casing adjacent to the audio/video capturing module for displaying the image. The upper casing further includes a control circuit therein for driving an optical disk read/write module installed on the lower casing, such that the optical disk read/write module can process the audio/video signal and execute a data burning operation for writing the audio/video signal into an optical disk in the optical disk read/write module.

12 Claims, 4 Drawing Sheets

MOBILE COMMUNICATION APPARATUS WITH MULTIMEDIA AUDIO/VIDEO FUNCTIONS

FIELD OF THE INVENTION

The present invention relates to a mobile communication apparatus with multimedia audio/video functions, and more particularly to a mobile communication apparatus having an upper casing and a lower casing movably connected to a backside of the upper casing and engaged with the upper casing for enabling an optical disk read/write module mounted on the lower casing to receive audio/video signal transmitted from an audio/video capturing module disposed on the upper casing and write the audio/video signal into an optical disk in the optical disk read/write module.

BACKGROUND OF THE INVENTION

Presently, due to the advances of network and communication technologies, various network apparatuses and communication apparatuses are rapidly developed and widely applied to daily life and working space of consumers, so as to enhance and improve the speed and efficiency of information communication and to increase the convenience of the daily life and working space of the consumers. Furthermore, due to the development of electronic industries, various consumer electronics, such as mobile phones or Personal Digital Assistants (PDAs), are more and more compact and the cost thereof is gradually lowered down while various accessories thereof are continuously developed. Thus, the consumer electronics, especially communication devices thereof, are not only provided with essential functions of the mobile phones or the PDAs, but also provided with other communication functions, such as high-speed Internet accessing, game downloading, wireless shopping, video recording, photograph taking, and etc. As a result, unavailable wireless communications, network services, and varied recording functions in the past have become available now and will be a requisite of the daily life and working space of most of the consumers.

Although the traditional communication devices of the consumer electronics are used to easily carry out the communication functions of high-speed Internet accessing, game downloading, wireless shopping, video recording, or photograph taking, the traditional communication devices, such as traditional mobile phones or PDAs, are only provided with limited built-it data storage space. However, current games or other audio/video files downloaded by high-speed Internet accessing have a file size which may be too large to fully save into the limited built-in data storage space, i.e. the traditional communication devices can not provide enough data storage space resulting in the operation inconvenience of the consumers. To solve the foregoing problems, most of the consumers can only purchase additional storage media to expand the limited built-in data storage space, but the additional storage media is generally expensive memory cards having a storage capacity lower than 1 GB. Thereby, most of the consumers have no desire to purchase the uneconomic storage media.

Except for the storage capacity, another critical factor when the consumers purchase the mobile phones or PDAs is the operation convenience thereof. As described above, economically available memory cards generally have a storage capacity lower than 1 GB. In comparison with general 8mm DVD-RW disks (double-layer disk: 2.8 GB, or mono-layer disk: 1.4 GB), the memory cards are more expensive than the DVD-RW disks. Meanwhile, audio/video files stored in the memory cards cannot be immediately played via traditional family DVD players for sharing with families and friends. Alternatively, the audio/video files stored in the memory cards need to be firstly read out via an information transmission device or a computer, and then be converted into a readable information format for the family DVD player. As a result, the memory cards form a barrier to communicate and transmit information, and are inconvenient to operate. Furthermore, traditional mobile phones and PDAs with video recording functions or multimedia functions generally provide limited built-in storage capacity that is not enough to store long-term recorded data. Even though the memory cards are inserted into the traditional mobile phones and PDAs, the memory cards still cannot provide enough storage space. As a result, the video recording functions, multimedia functions, or other functions of the traditional mobile phones and PDAs cannot be operated in an optimal manner. Especially, with the trend of increasing a camera resolution of the traditional mobile phones and PDAs day by day, the foregoing problems are more and more serious. Therefore, if related manufacturers can develop improved mobile phones and PDAs with a greater storage capacity for conveniently communication information, consumers will pay attention to the improved mobile phones and PDAs so that the related manufacturers will increase their competitive advantage.

It is therefore tried by the inventor to develop a mobile communication apparatus with multimedia audio/video functions, to solve the problems existing in the traditional mobile phones and PDAs that cannot provide enough built-in storage capacity, and can only be supported by expensive memory cards resulting in generating the operation inconvenience and shortcomings, as described above.

SUMMARY OF THE INVENTION

A primary objective of the present invention is to provide a mobile communication apparatus with multimedia audio/video functions, which is provided with an upper casing, a lower casing movably connected to a backside of the upper casing, and an audio/video capturing module mounted on one end of the upper casing, wherein the upper and lower casings are engaged with each other, and the audio/video capturing module is used to receive and sample an image and/or a sound source within an area, and the output an audio/video signal which is sent to a screen display mounted on a surface of the upper casing adjacent to the audio/video capturing module for displaying the image, the upper casing further includes a control circuit therein, the control circuit is electrically connected to the audio/video module, the screen display, and an optical disk read/write module mounted on a surface of the lower casing for receiving and transmitting the audio/video signal, when the upper and lower casings are engaged with each other and an optical disk is placed on the optical disk read/write module, the control circuit is used to drive the optical disk read/write module to execute a data burning operation for writing the audio/video signal into the optical disk.

BRIEF DESCRIPTION OF THE DRAWINGS

The structure and the technical means adopted by present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
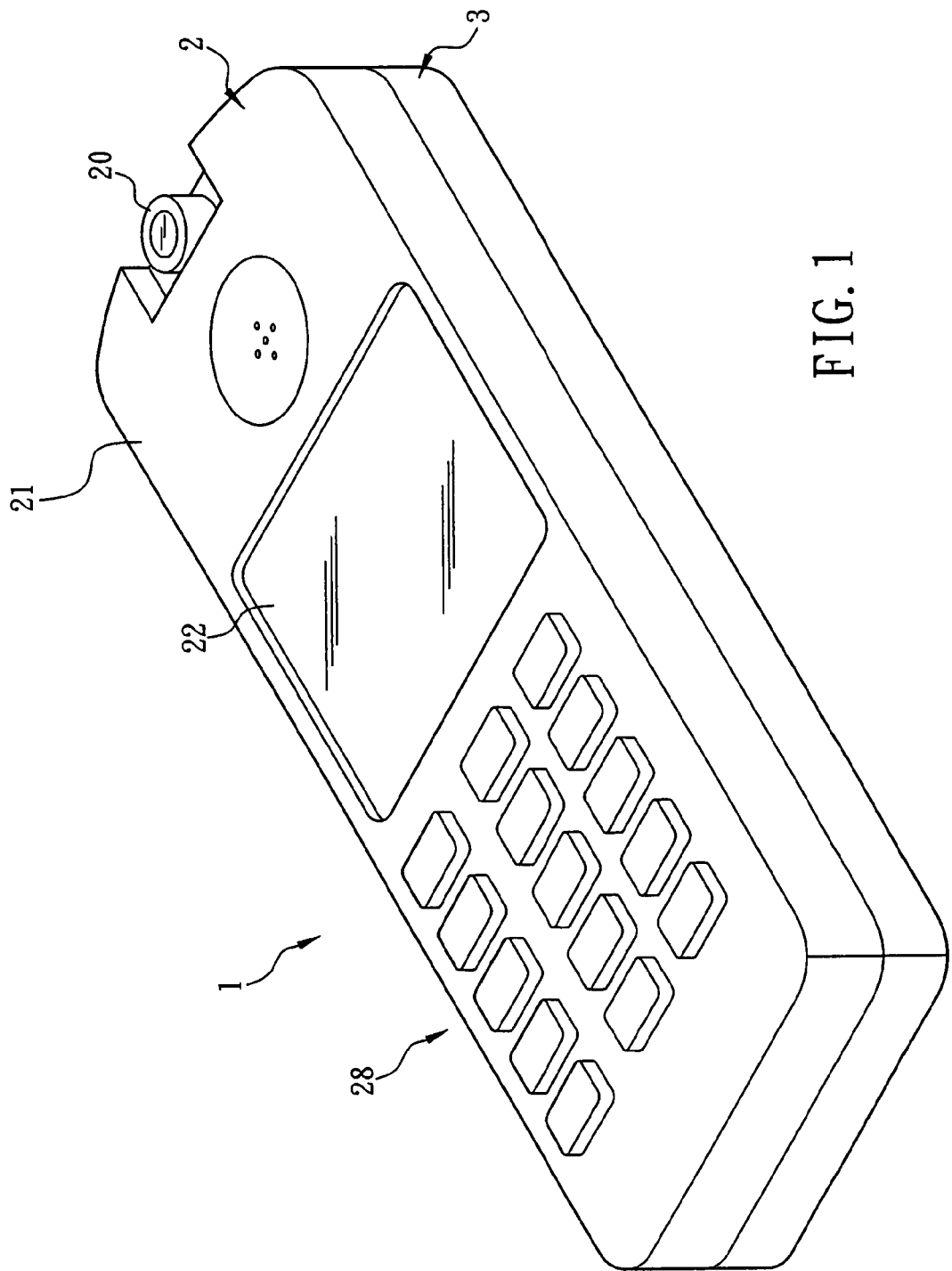
FIG. 1 is a schematic view of a mobile communication apparatus according to a preferred embodiment of the present invention.
Figure 2:
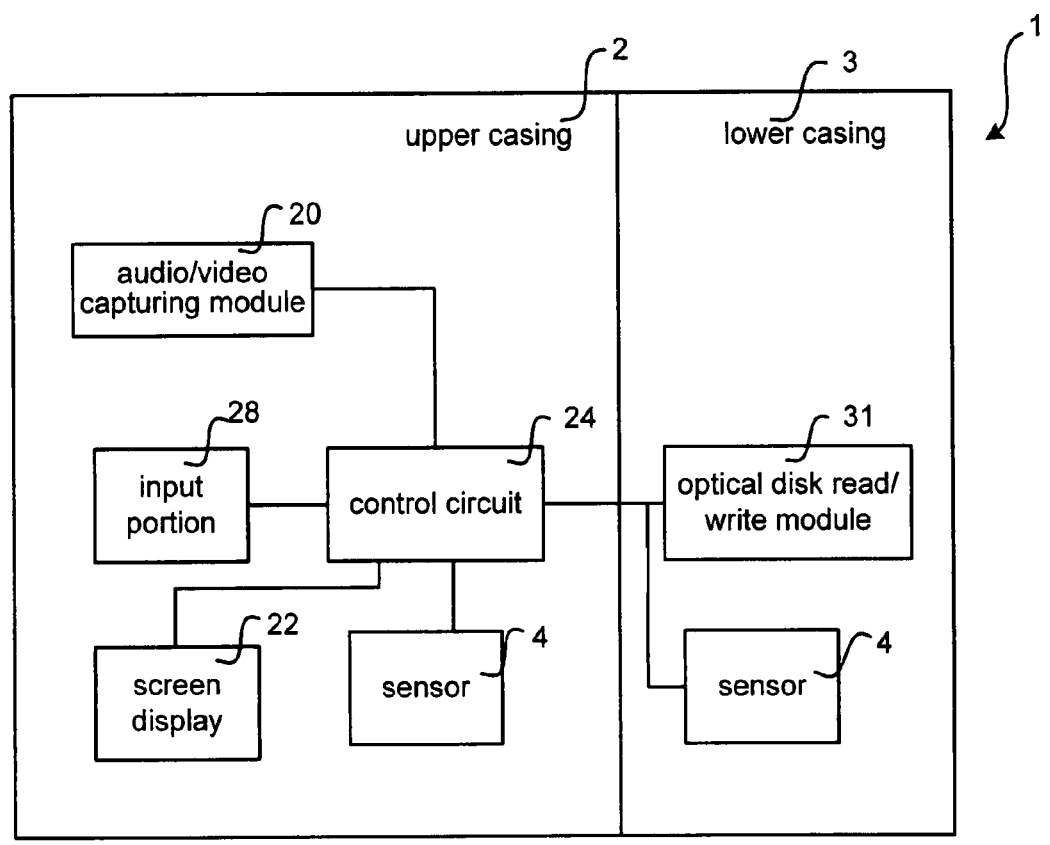
FIG. 2 is a block diagram of a circuit of the mobile communication apparatus according to the preferred embodiment of the present invention.
Figure 3:
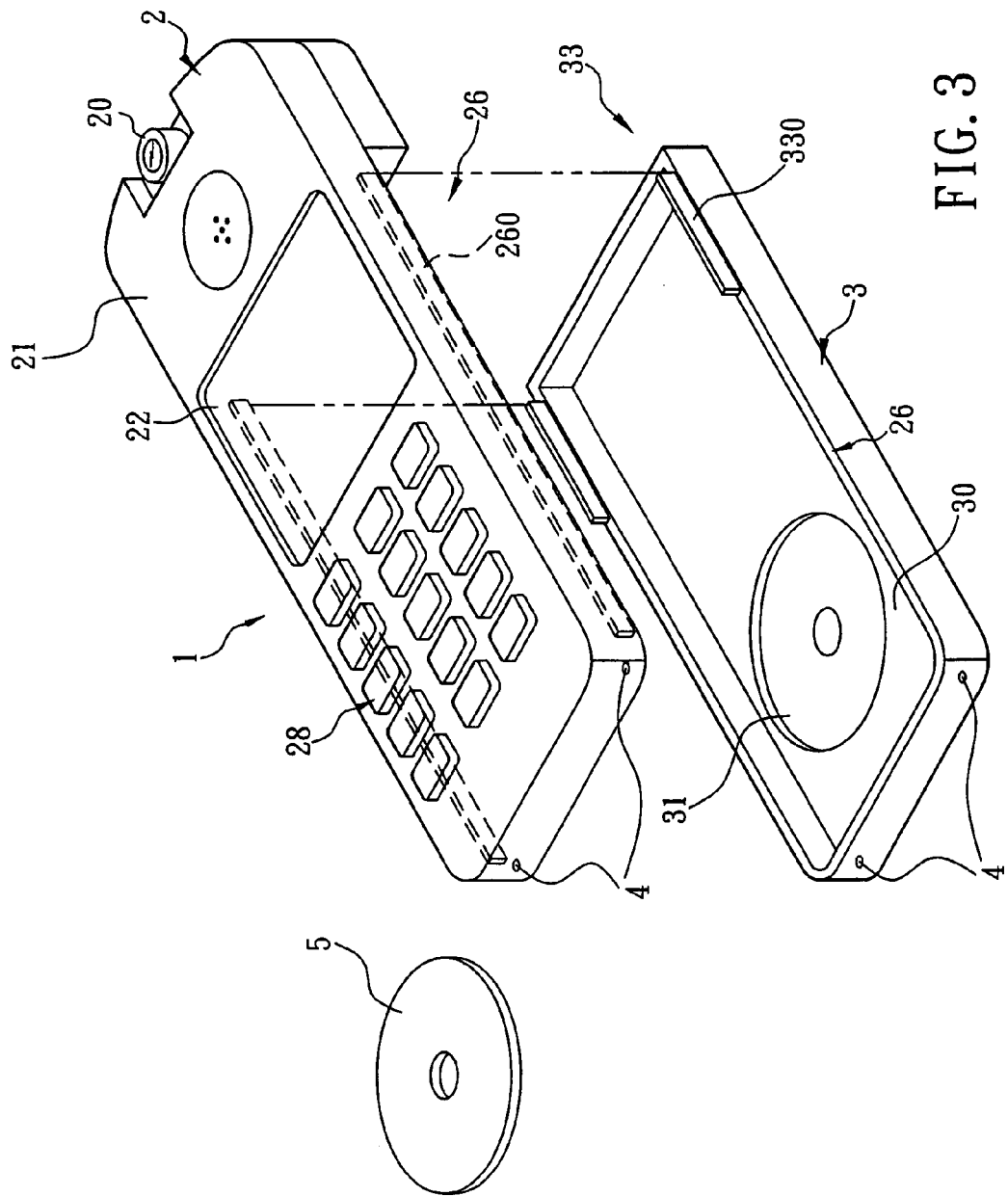
FIG. 3 is an exploded view of a mobile communication apparatus according to the preferred embodiment of the present invention.

Referring now to FIGS. 1 and 2, a mobile communication apparatus with multimedia audio/video functions according to a preferred embodiment of the present invention is illustrated. As shown, the mobile communication apparatus designated by numeral 1 comprises an upper casing 2, and a lower casing 3. The lower casing 3 has a surface 30 (as shown in FIG. 3) movably connected to a backside of the upper casing 2, and the upper casing 2 and the lower casing 3 are engaged with each other to integrate into a unit, so that the mobile communication apparatus 1 is constituted in a closed state. Furthermore, the lower casing 3 can be outwardly moved relatively to the backside of the upper casing 2 in a suitable manner, so that the mobile communication apparatus 1 can be shifted to an opened state. Moreover, the upper casing 2 has a surface 21 provided with an audio/video capturing module 20 and screen display 22, wherein the audio/video capturing module 20 is mounted on one end of the upper casing 2. The audio/video capturing module 20 can be used to receive and sample an image and/or a sound source within an area, and then convert the image and/or the sound into an audio/video signal for outputting. The screen display 22 mounted on the surface 21 of the upper casing 2 is adjacent to the audio/video capturing module 20, and can be used to receive the audio/video signal for displaying the image, so that a user can view the image captured by the audio/video capturing module 20 via the screen display 22.

Referring now to FIGS. 1, 2, and 3, in the preferred embodiment of the present invention, the surface 30 of the lower casing 3 is corresponding to the backside of the upper casing 2, and provided with an optical disk read/write module 31 which is used to received and optical disk 5. Furthermore, the upper casing 2 is provided with a control circuit 24 therein. The control circuit 24 is electrically connected to an input portion 28, the screen display 22, and the optical disk read/write module 31 for receiving and transmitting the audio/video signal. When the upper casing 2 and the lower casing 3 are engaged with each other in the closed state and the optical disk 5 is placed on the optical disk read/write module 31, the control circuit 24 is used to drive the optical disk read/write module 31 to execute a data burning operation for writing the audio/video signal into the optical disk 5. Therefore, the user can optionally burn the image and sound captured by the audio/video capturing module 20 into the optical disk 5 via the optical disk read/write module 31, so as to solve the problems existing in the traditional mobile phones and PDAs that cannot provide enough built-in storage capacity, as described in the background of the present invention, while the derived operation inconvenience and shortcomings of the traditional mobile phones and PDAs can also be prevented.

Referring still to FIGS. 1 and 3, in the preferred embodiment of the present invention, the backside of the upper casing 2 is provided with at least one first sliding portion 26 thereon, while the surface 30 of the lower casing 3 is provided with at least one second sliding portion 33 thereon. The first sliding portion 26 is slidably mounted on the second sliding portion 33, so that the first sliding portion 26 can slide relatively to the second sliding portion 33. When the upper casing 2 is pushed toward one end of the lower casing 3, the mobile communication apparatus 1 is shifted to the opened state, such that the surface 30 of the lower casing 3 can be exposed out of the backside of the upper casing 2. As a result, the optical disk 5 can be placed on the optical disk read/write module 31.

Referring still FIGS. 1 and 3, in the preferred embodiment of the present invention, the first sliding portion 26 further comprises a pair of sliding grooves 260 respectively formed on two opposite edges of the backside of the upper casing 2. Each of the two sliding grooves 260 has one end adjacent to one end of the upper casing 2. Furthermore, the second sliding portion 33 further comprises a pair of sliding blocks 330 respectively formed on two opposite edges of the lower casing 3 and adjacent to one end of the lower casing 3. The two sliding blocks 330 can be respectively received in the two sliding grooves 260. When the mobile communication apparatus 1 is in the closed state, the two sliding blocks 330 is slid up to one inner end of the two sliding grooves 260. When the mobile communication apparatus 1 is in the opened state, the two sliding blocks 330 is slid toward one outer end of the two sliding grooves 260, such that the optical disk 5 can be placed on the optical disk read/write module 31.

Figure 4:
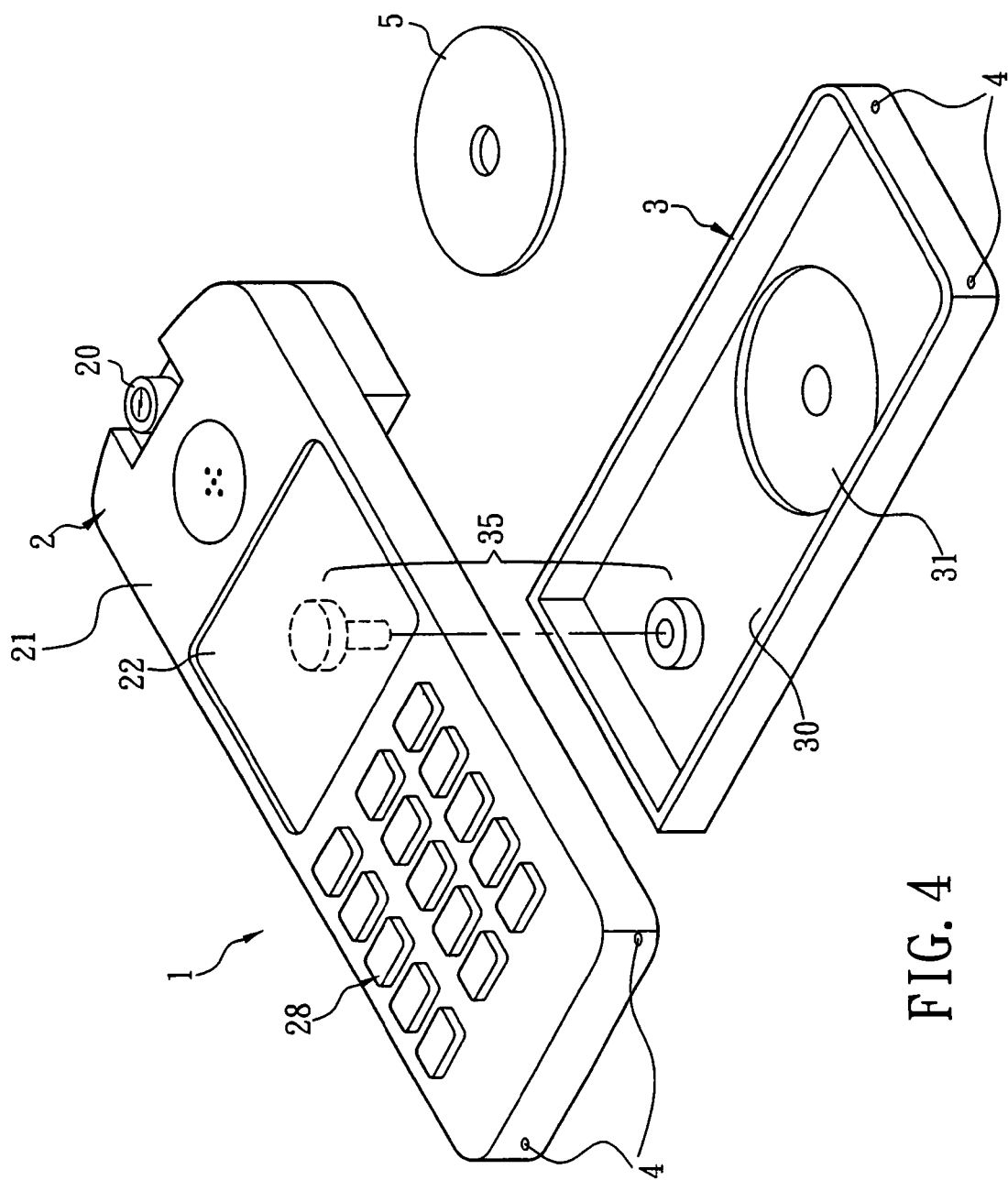
FIG. 4 is an exploded view of a mobile communication apparatus according to another preferred embodiment of the present invention.

Referring now to FIGS. 1 and 4, in another preferred embodiment of the present invention, the upper casing 2 and the lower casing 3 is provided with a pair of pivotal portion 35 therebetween. The lower casing 3 can be ratated out of one side edge of the upper casing 2 via the pivotal portion 35, so that the mobile communication apparatus 1 can be shifted to the opened state and the surface 30 of the lower casing 3 will be exposed out of the backside of the upper casing 2. As a result, the optical disk 5 can be placed on the optical disk read/write module 31. Furthermore, the pivotal portion 35 is mounted adjacent to one end of the upper casing 2 and a corresponding end of the lower casing 3. When the lower casing 3 is rotated outward relatively to the side edge of the upper casing 2 via the pivotal portion 35, the mobile communication apparatus 1 can be shifted to the opened state. Meanwhile, the other end of the lower casing 3 will be apart from the other end of the upper casing 2, i.e. the surface 30 of the lower casing 3 will be exposed out of the backside of the upper casing 2. As a result, the optical disk 5 can be placed on the optical disk read/write module 31.

Referring back to FIGS. 2, 3 and 4, in the two preferred embodiments of the present invention, the backside of the upper casing 2 is provided with at least one sensor 4 adjacent to one outer end thereof, while the surface 30 of the lower casing 3 opposite to the backside of the upper casing 2 is also provided with at least one sensor 4 adjacent to one outer end thereof. When the mobile communication apparatus 1 is in the closed state, the sensor 4 of the upper casing 2 and the sensor 4 of the lower casing 3 are close to each other, and the sensors 4 will output a first state signal to the control circuit 24. When the mobile communication apparatus 1 is in the opened state, the sensor 4 of the upper casing 2 and the sensor 4 of the lower casing 3 are apart from each other, and the sensors 4 will output a second state signal to the control circuit 24.

Referring back to FIGS. 2, 3 and 4, in the two preferred embodiments of the present invention, the surface 21 of the upper casing 2 is provided with the input portion 28 adjacent to one end of the upper casing 2. The input portion 28 can be pressed to generate a driving signal. When the optical disk read/write module 31 receives the optical disk 5 and the control circuit 24 receives the first state signal, the audio/video signal, and the driving signal, the optical disk read/write module 31 can be driven to execute a data burning operation for writing the audio/video signal into the optical disk 5. When the control circuit 24 receives the second state signal, the control circuit 24 sends a notice signal (such as a signal to warn that the optical disk read/write module 31 is out of the mobile communication apparatus 1) to the screen display 22 for displaying the image. Therefore, the mobile communication apparatus with multimedia audio/video functions according to the preferred embodiment of the present invention can be used without being limited by the storage capacity of the mobile communication apparatus 1, and the image and sound can be burned into the optical disk 5. Furthermore, various audio/ video signal captured by the mobile communication apparatus 1 can be conveniently stored, and easily accessed/ communicated, so as to solve the problems of the derived operation inconvenience and shortcomings of the traditional mobile phones and PDAs due to the limited built-in storage capacity, as described above.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A mobile communication apparatus with multimedia audio/video functions, comprising:
   an upper casing;
   an audio/video capturing module mounted on one end of the upper casing for receiving and sampling an image and/or a sound source within an area, so as to output an audio/video signal;
   a screen display mounted on a surface of the upper casing adjacent to the audio/video capturing module for receiving the audio/video signal to display;
   a lower casing movably connected to a backside of the upper casing, wherein when the upper and lower casings are engaged with each other, the mobile communication apparatus is in a closed state, or when the lower casing is moved outward with respect to the backside of the upper casing, the mobile communication apparatus is in an opened state;
   an optical disk read/write module mounted on a surface of the lower casing; and
   a control circuit mounted in the upper casing and electrically connected to the screen display and the optical disk read/write module, wherein when the optical disk read/write module receives an optical disk and the mobile communication apparatus is in the closed state, the control circuit drives the optical disk read/write module to execute a data burning operation for writing the audio/video signal into the optical disk.

2. The mobile communication apparatus with multimedia audio/video functions of claim 1, wherein the backside of the upper casing is provided with at least one first sliding portion, the surface of the lower casing is provided with at least one second sliding portion, and the first sliding portion is slidably mounted on the second sliding portion, when the upper casing is pushed toward one end of the lower casing, the mobile communication apparatus is shifted to the opened state.

3. The mobile communication apparatus with multimedia audio/video functions of claim 2, wherein the first sliding portion further comprises a pair of sliding grooves respectively formed on two opposite edges of the backside of the upper casing, and each of the two sliding grooves has one end adjacent to one end of the upper casing.

4. The mobile communication apparatus with multimedia audio/video functions of claim 3, wherein the second sliding portion further comprises a pair of sliding blocks respectively formed on two opposite edges of the lower casing and adjacent to one end of the lower casing, and the two sliding blocks are respectively received in the two sliding grooves, when the mobile communication apparatus is in the closed state, the two sliding blocks is slid up to one end of the two sliding grooves, and when the mobile communication apparatus is in the opened state, the two sliding blocks is slid toward the other end of the two sliding grooves.

5. The mobile communication apparatus with multimedia audio/video functions of claim 1, wherein the upper casing and the lower casing is provided with a pair of pivotal portion therebetween, and the lower casing is rotated out of one side edge of the upper casing via the pivotal portion, so that the mobile communication apparatus is shifted to the opened state and the surface of the lower casing is exposed out of the backside of the upper casing.

6. The mobile communication apparatus with multimedia audio/video functions of claim 5, wherein the pivotal portion is mounted adjacent to one end of the upper casing and a corresponding end of the lower casing, when the lower casing is rotated outward relatively to the side edge of the upper casing via the pivotal portion, the mobile communication apparatus is shifted to the opened state, and the other end of the lower casing is apart from the other end of the upper casing, while the surface of the lower casing is exposed out of the backside of the upper casing.

7. The mobile communication apparatus with multimedia audio/video functions of claim 4, wherein the backside of the upper casing is provided with at least one sensor adjacent to one end thereof, and the surface of the lower casing opposite to the backside of the upper casing is provided with at least one sensor adjacent to one end thereof, when the mobile communication apparatus is in the closed state, the sensor of the upper casing and the sensor of the lower casing are close to each other and output a first state signal to the control circuit, and when the mobile communication apparatus is in the opened state, the sensor of the upper casing and the sensor of the lower casing are apart from each other, and output a second state signal to the control circuit.

8. The mobile communication apparatus with multimedia audio/video functions of claim 7, wherein when the control circuit receives the second state signal, the control circuit sends a notice signal to the screen display.

9. The mobile communication apparatus with multimedia audio/video functions of claim 8, wherein the surface of the upper casing is provided with the input portion adjacent to one end of the upper casing, the input portion is pressed to generate a driving signal, when the optical disk read/write module receives the optical disk and the control circuit receives the first state signal, the audio/video signal, and the driving signal, the optical disk read/write module is driven to execute the data burning operation for writing the audio/video signal into the optical disk.

10. The mobile communication apparatus with multimedia audio/video functions of claim 6, wherein the backside of the upper casing is provided with at least one sensor adjacent to one end thereof, and the surface of the lower casing opposite to the backside of the upper casing is provided with at least one sensor adjacent to one end thereof, when the mobile communication apparatus is in the closed state, the sensor of the upper casing and the sensor of the lower casing are close to each other and output a first state signal to the control circuit, and when the mobile communication apparatus is in the opened state, the sensor of the upper casing and the sensor of the lower casing are apart from each other, and output a second state signal to the control circuit.

11. The mobile communication apparatus with multimedia audio/video functions of claim 10, wherein when the control circuit receives the second state signal, the control circuit sends a notice signal to the screen display.

12. The mobile communication apparatus with multimedia audio/video functions of claim 11, wherein the surface of the upper casing is provided with the input portion adjacent to one end of the upper casing, the input portion is pressed to generate a driving signal, when the optical disk read/write module receives the optical disk and the control circuit receives the first state signal, the audio/video signal, and the driving signal, the optical disk read/write module is driven to execute the data burning operation for writing the audio/video signal into the optical disk.

\* \* \* \* \*